(12) United States Patent
Rosano

(10) Patent No.: US 7,537,802 B2
(45) Date of Patent: May 26, 2009

(54) AQUEOUS COPOLYMER COMPOSITION AND METHOD FOR PREPARING A COATING THEREFROM

(75) Inventor: William J. Rosano, Hatboro, PA (US)

(73) Assignee: Rohm and Haas Company, Philadelphia, PA (US)

( * ) Notice: Subject to any disclaimer, the term of this patent is extended or adjusted under 35 U.S.C. 154(b) by 694 days.

(21) Appl. No.: 10/858,872

(22) Filed: Jun. 2, 2004

(65) Prior Publication Data

US 2004/0247783 A1 Dec. 9, 2004

Related U.S. Application Data

(60) Provisional application No. 60/476,966, filed on Jun. 9, 2003.

(51) Int. Cl.
*G03F 7/038* (2006.01)
*C08L 91/00* (2006.01)
*C09D 3/80* (2006.01)
*B05D 3/02* (2006.01)
*C08F 220/40* (2006.01)
*C08K 5/04* (2006.01)
*C08K 5/16* (2006.01)
*C04B 24/24* (2006.01)

(52) U.S. Cl. .............. 427/180; 427/372.2; 524/565; 524/813; 524/808; 524/812; 524/816; 430/286.1; 430/281.1

(58) Field of Classification Search ............ 524/315, 524/565, 317, 244; 427/180, 372.2; 260/29.7
See application file for complete search history.

(56) References Cited

U.S. PATENT DOCUMENTS

| 4,094,841 | A | * | 6/1978 | Mani ................... 524/748 |
| 4,144,212 | A | * | 3/1979 | Linder et al. ............ 524/818 |
| 4,810,738 | A | * | 3/1989 | Caridi ................... 524/317 |
| 5,264,530 | A | | 11/1993 | Darmon et al. |
| 5,356,968 | A | | 10/1994 | Rupaner et al. |
| 5,484,849 | A | | 1/1996 | Bors et al. |
| 5,559,192 | A | | 9/1996 | Bors et al. |
| 5,733,970 | A | | 3/1998 | Craun |
| 6,107,397 | A | * | 8/2000 | Blankenburg et al. ...... 524/813 |
| 6,624,223 | B1 | | 9/2003 | Thames et al. |
| 6,964,986 | B2 | * | 11/2005 | Bachon et al. ............ 524/2 |

FOREIGN PATENT DOCUMENTS

WO   WO 00/56823   9/2000

* cited by examiner

*Primary Examiner*—Duane Smith
*Assistant Examiner*—Ives Wu
(74) *Attorney, Agent, or Firm*—Gary Greenblatt; Cantor Colburn, LLP

(57) ABSTRACT

An aqueous copolymer composition containing copolymer particles containing polymerized units of (meth)acrylonitrile, (meth)acrylamide, or combinations thereof; and at least one unsaturated fatty acid ester is provided. A method is provided for preparing a coating from the aqueous copolymer composition. The aqueous copolymer composition is useful for preparing crosslinked coatings, suitable in coating applications such as architectural or maintenance paints.

15 Claims, No Drawings

AQUEOUS COPOLYMER COMPOSITION AND METHOD FOR PREPARING A COATING THEREFROM

CROSS REFERENCE TO RELATED PATENT APPLICATIONS

This is a non-provisional application of prior pending U.S. provisional application Ser. No. 60/476,966 filed Jun. 9, 2003.

This invention generally relates to an aqueous copolymer composition containing copolymer particles dispersed in an aqueous medium, and unsaturated fatty acid esters. The copolymer particles contain polymerized methacrylonitrile, acrylonitrile, or other select monomers. The aqueous copolymer composition is useful for preparing dried coatings having a combination of good film formation properties, and good block resistance. The invention also relates to a method for preparing a coating from the aqueous copolymer composition.

Coating compositions, such as latex paints, contain binder polymer particles dispersed in an aqueous medium. Upon drying, the binder polymer particles undergo a film formation process in which the binder polymer particles coalesce to form a polymeric film. However, many binder polymer particles are not film forming at ambient temperatures, such as temperatures in the range of 5° C. to 40° C. Typically, coalescents are incorporated into these coating compositions to aid in the film formation process of the binder polymer particles at ambient temperatures. Examples of common coalescents include ethylene glycol monoalkyl ethers, esters, diesters, diethylene glycol monoalkyl ethers, and propylene glycol monoalkyl aromatic ethers. After film formation, the coalescents gradually evaporate from the dried paint films to leave coatings having the required physical properties, such as hardness, solvent resistance, block resistance, or water resistance.

The release of volatile organic compounds (VOCs) into the atmosphere has been identified as a contributing factor in the formation of tropospheric ozone, particularly in urban areas. In many coating applications, sources of VOCs include coalescents, cosolvents, or other organic compounds that evaporate from drying or dried paint films. Coating compositions that can be formulated with lower levels of VOCs are desired, especially, coating compositions that have a zero level of VOCs. However, the removal of coalescents from coating compositions adversely affects the film formation properties of the binder polymer particles and the properties of the resulting dry film. The inclusion of nonvolatile plasticizing agents in the coating composition aids film formation, but diminishes film properties such as block resistance or soil resistance. Desired are aqueous coating compositions that can be formulated with lower levels of VOCs, and that can provide dried films having acceptable block resistance.

WO 00/56823 discloses a film-forming composition containing polymer particles and a coalescent aid. The coalescent aid is an ester of an unsaturated fatty acid. The reference discloses examples of a semigloss paint formulation and a flat paint formulation prepared from polymer particles and containing the unsaturated fatty acid ester as a coalescent aid. The block resistance of a dried film prepared from the semigloss paint formulation had improved block resistance compared to a dried film prepared from a semigloss paint formulation that contained a volatile coalescent in place of the unsaturated fatty acid ester. However, a dried film prepared from the flat paint formulation had lower blocking resistance compared to a dried film prepared from a flat paint formulation that contained a volatile coalescent in place of the unsaturated fatty acid ester.

Desired are aqueous coating compositions that provide dried films having improved levels of block resistance, and further, may be formulated with lower levels of VOCs.

The inventors have surprisingly discovered an aqueous copolymer composition that provides dried films having improved block resistance. The aqueous copolymer composition contains a combination of unsaturated fatty acid esters and copolymer particles that contain certain monomers as polymerized units. The aqueous copolymer composition may be formulated with lower levels of VOC, including zero VOC.

According to the first aspect of the present invention, an aqueous copolymer composition is provided including copolymer particles containing as polymerized units, based on weight of the copolymer particles: from 5 to 60 weight % of a first monomer selected from (meth)acrylonitrile, (meth)acrylamide, or combinations thereof, from 25 to 95 weight % of a nonionic monomer, and from 0 to 15 weight % of an anionic monomer; and one or more unsaturated fatty acid esters; wherein the copolymer particles have a glass transition temperature in the range of from zero to 70° C.

A second aspect of the present invention provides a method for preparing a coating, including the steps of: applying an aqueous copolymer composition onto a substrate; wherein the aqueous copolymer composition contains copolymer particles having as polymerized units, based on weight of the copolymer particles: from 5 to 60 weight % of a first monomer selected from (meth)acrylonitrile, (meth)acrylamide, or combinations thereof, from 25 to 95 weight % of a nonionic monomer, and from zero to 15 weight % of an anionic monomer; and drying or allowing to dry the aqueous copolymer composition applied to the substrate to prepare the coating.

As used herein, the use of the term "(meth)" followed by another term such as acrylate refers to both acrylates and methacrylates. For example, the term "(meth)acrylate" refers to either acrylate or methacrylate; the term "(meth)acrylic" refers to either acrylic or methacrylic; the term "(meth)acrylonitrile" refers to either acrylonitrile or methacrylonitrile; and the term "(meth)acrylamide" refers to either acrylamide or methacrylamide.

"Glass transition temperature" or "$T_g$" as used herein, means the temperature at or above which a glassy polymer will undergo segmental motion of the polymer chain. Glass transition temperatures of a polymer can be estimated by the Fox equation [*Bulletin of the American Physical Society* 1, 3 Page 123 (1956)] as follows:

$$\frac{1}{T_g} = \frac{w_1}{T_{g(1)}} + \frac{w_2}{T_{g(2)}}$$

For a copolymer, $w_1$ and $w_2$ refer to the weight fraction of the two comonomers, and $T_{g(1)}$ and $T_{g(2)}$ refer to the glass transition temperatures of the two corresponding homopolymers in Kelvin. For polymers containing three or more monomers, additional terms are added ($w_n/T_{g(n)}$). The $T_g$ of a polymer phase can also be calculated by using the appropriate values for the glass transition temperatures of homopolymers, which may be found, for example, in "Polymer Handbook", edited by J. Brandrup and E. H. Immergut, Interscience Publishers. The values of $T_g$ reported herein are calculated using the Fox equation.

As used herein, the term "dispersion" refers to a physical state of matter that includes at least two distinct phases, wherein a first phase is distributed in a second phase, with the second phase being a continuous medium.

The term "pendant" is used in the specification to mean "attached to the polymer backbone" The term "pendant" also includes attachment of such groups at the termini of a polymer chain.

The aqueous copolymer composition of the present invention includes select copolymer particles dispersed in an aqueous medium, and one or more unsaturated fatty acid esters.

The copolymer particles included in the aqueous copolymer composition, are addition polymers formed by polymerization of ethylenically unsaturated monomers. As used herein "copolymer" refers to a polymer containing two or more different types of monomers as polymerized units. The different types of monomer units may be randomly distributed on the copolymer backbone as a random copolymer, or as a block copolymer containing blocks of one type of polymerized monomer followed by blocks of a different polymerized monomer. The glass transition temperature of the copolymer particles is in the range of from zero to 70° C., preferably in the range of from 15 to 50° C., and more preferably in the range of from 20 to 40° C. The average diameter of the copolymer particles are typically in the range of from 50 to 500 nanometers (nm), preferably in the range of from 80 to 300 nm, and more preferably in the range of from 100 to 250 nm. Average particle diameter is measured by a quasielastic light scattering technique, such as provided, for example, by the Model BI-90 Particle Sizer, of Brookhaven Instruments Corp. A dispersion containing the copolymer particles may have an unimodal or a multimodal, including a bimodal particle size distribution.

The copolymer particles include as polymerized units, one or more first monomers selected from (meth)acrylonitrile, (meth)acrylamide, or combinations thereof. The amount of the polymerized first monomer contained in the copolymer particles is typically in the range of from 5 to 60 weight %, preferably from 8 to 50 weight %, and more preferably from 10 to 40 weight %, based on the weight of the copolymer particles.

The copolymer particles also include as polymerized units at least one nonionic monomer. A nonionic monomer is a monomer that does not have a pendant acid or base group. Examples of nonionic monomer include styrene; butadiene; α-methyl styrene; vinyl toluene; vinyl naphthalene; ethylene; propylene; vinyl acetate; vinyl versatate; vinyl chloride; vinylidene chloride; various $C_1$-$C_{40}$ alkyl esters of (meth)acrylic acid, such as methyl (meth)acrylate, ethyl (meth)acrylate, n-butyl (meth)acrylate, 2-ethylhexyl (meth)acrylate, cyclohexyl (meth)acrylate, n-octyl (meth)acrylate, n-decyl (meth)acrylate, n-dodecyl (meth)acrylate, tetradecyl (meth)acrylate, lauryl (meth)acrylate, oleyl (meth)acrylate, palmityl (meth)acrylate, and stearyl (meth)acrylate; other (meth)acrylates such as isobornyl (meth)acrylate, benzyl (meth)acrylate, phenyl (meth)acrylate, and 2-bromoethyl (meth)acrylate; alkoxyalkyl (meth)acrylates, such as ethoxyethyl (meth)acrylate; full esters of ethylenically unsaturated di- and tricarboxylic acids and anhydrides, such as diethyl maleate, dimethyl fumarate, and ethyl methyl itaconate. Other suitable nonionic monomers include multiethylenically unsaturated monomers, which are effective for increasing the molecular weight of the copolymer particles. Examples of multiethylenically unsaturated monomers include tripropylene glycol di(meth)acrylate, diethylene glycol di(meth)acrylate, ethylene glycol di(meth)acrylate, 1,6-hexanediol di(meth)acrylate, 1,3-butylene glycol di(meth)acrylate, polyalkylene glycol di(meth)acrylate, diallyl phthalate, trimethylolpropane tri(meth)acrylate, divinylbenzene, divinyltoluene, trivinylbenzene, and divinyl naphthalene. The nonionic monomer expressly excludes first monomers and anionic monomers.

Suitable levels of polymerized nonionic monomer in the copolymer particles include from 25 to 95 weight %, preferably from 35 to 92 weight %, and more preferably, from 45 to 90 weight %, based on the weight of the copolymer particles.

The copolymer particles optionally include as polymerized units one or more anionic monomers. The polymerized anionic monomer is commonly included in the copolymer particles to help in stabilizing the copolymer particles in the aqueous medium. As used herein, "anionic monomer" refers to an ethylenically unsaturated monomer containing at least one pendant acid group and salts thereof. Anionic monomers include carboxylic acid containing monomers such as (meth)acrylic acid, itaconic acid, fumaric acid, and maleic acid; anhydrides, which can form carboxylic acid monomers in the presence of water, such as itaconic anhydride and maleic anhydride; and partial esters of multicarboxylic acid monomers, such as ethyl maleate. Other examples of acid containing monomers are phosphorus acid monomers such as 2-phosphoethyl (meth)acrylate; and sulfur acid monomers such as sodium vinyl sulphonate, 2-acrylamido-2-methylpropane sulfonic acid, vinyl sulphonic acid, styrene sulphonic acid, sulfoethyl (meth)acrylate, and methacryloxyisopropyl acid sulfophthalate, and hydroxy, dihydroxy, amino or diamino alkyl or aryl sulfonic acids, such as, 1,4-butanediol 2-sulfonic acid. As used herein, "anionic monomer" expressly excludes first monomers and nonionic monomers.

The first monomer, the one nonionic monomer, and the optional anionic monomer are typically chosen to provide the copolymer particles with one or more desired properties, such as glass transition temperature or chemical resistance, as well as to provide sets of monomers that copolymerize to form the copolymer particles.

The copolymer particles optionally contain monomers having crosslinking groups, which are capable of forming chemical bonds during or after film formation. The crosslinking monomers may be first monomers, nonionic monomers, or anionic monomers. Examples of suitable crosslinking groups include groups containing one or more vinyl moieties such as (meth)acryloxy groups, allyl groups, and diene groups; groups containing aldehyde or ketone moieties such as acetoacetoxy groups and cyanoacetoxy groups; primary amine groups; urea groups such as ethyleneureido groups; thiourea groups; imidazoline groups; and oxazolidine groups. Examples of crosslinking monomers include acetoacetyl functional monomers, such as acetoacetoxyethyl (meth)acrylate, allyl acetoacetate, vinyl acetoacetate, acetoacetoxypropyl (meth)acrylate, acetoacetoxybutyl (meth)acrylate, 2,3-di (acetoacetoxy)propyl (meth)acrylate, and combinations thereof; cyanoacetoxy functional monomers, such as cyanoacetoxyethyl (meth)acrylate, cyanoacetoxypropyl (meth)acrylate, allyl cyanoacetate, and vinyl cyanoacetate. Other suitable crosslinking monomers include urea functional monomers, which are monomers having an ethylenic unsaturation and one or more urea groups. Examples of urea functional monomers include, but are not limited to, hydrogen ethyleneureidoethyl itaconamide, ethyleneureidoethyl hydrogen itaconate, bis-ethyleneureidoethyl itaconate, ethyleneureidoethyl undecylenate, ethyleneureidoethyl undecylenamide, ethyleneureidoethyl (meth)acrylate, (meth)acrylamidoethyl-ethyleneurea, N-(ethylenethioureido-ethyl)-10-undecenamide, butyl ethyleneureido-ethyl fumarate, methyl ethyleneureido-ethyl fumarate, benzyl N-(ethyleneureido-ethyl) fumarate, benzyl N-(ethyleneureido-ethyl) maleamate, N-vinoxyethylethylene-urea, N-(ethyleneureidoethyl)-crotonamide, ureidopentyl vinyl ether, 2-ureidoethyl (meth)acrylate, (meth)acryloxyacetamido-ethylethyleneurea, N-(ethyleneureidoethyl)-4-pentenamide, N-((meth)acrylamidoethyl)-N-(1-hydroxymethyl)ethyleneurea, N-((meth)acrylamidoethyl)-N-(1-methoxy)methylethyleneurea, N-formamidoethyl-N-(1-vinyl)ethyleneurea, N-vinyl-N-(1-aminoethyl)-ethyleneurea, 2-(3-methylolimidazolidone-2-yl-1)ethyl acrylate, 2-ethyleneureido ethyl (meth)acrylate, 1-[2-(3-allyloxy-2-hydroxy-propylamino)ethyl]-imidazolidin-2-one, N-2-(allylcarbamoto)aminoethyl imidazolidinone, and 1-(2-((2-hydroxy-3-(2-propenyloxy)propyl)amino)ethyl)-2-imidazolidinone. Further examples of crosslinking monomers include thiourea functional monomers, which are monomers having an ethylenic unsaturation and one or more thiourea groups. One example of a thiourea functional monomer is (meth)acrylamidoethylethylene thiourea. Still other examples of crosslinking monomers include oxazolidine functional monomers, which are monomers having an ethylenic unsaturation and one or more oxazolidine groups. Examples of oxazolidine functional monomers include 2-(3-oxazolidinyl)ethyl (meth)acrylate and N-(2-vinoxyethyl)-2-methyloxazolidine. Further examples of crosslinking monomers include oxazoline functional monomers, which are monomers having an ethylenic unsaturation and one or more oxazoline groups. One example of an oxazoline functional monomer is 4,4-dimethyl-2-isopropenyloxazoline. Still further examples of crosslinking monomers include amine functional monomers, which are monomers having an ethylenic unsaturation and one or more amine groups. Examples of amine functional monomers include, but are not limited to, 2-vinoxyethylamine, 2-vinoxyethylethylene-diamine, 3-aminopropyl vinyl ether, 2-amino-2-methylpropyl vinyl ether, and 2-aminobutyl vinyl ether. Crosslinking monomers containing vinyl groups as the crosslinking group include allyl (meth)acrylate, dicyclopentenyloxyethyl (meth)acrylate, and unsaturated fatty acid esters of (meth)acrylates, such as:

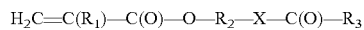

wherein $R_1$ is a hydrogen or methyl group; $R_2$ is a $C_2$ to $C_8$ linear or branched alkylene group; X is oxygen or nitrogen; and $R_3$ is a $C_8$ to $C_{30}$ hydrocarbon group having at least one carbon-carbon double bond. Examples of unsaturated fatty acid esters of (meth)acrylates includes esters derived from fatty oils such as corn oil, castor oil, cotton seed oil, linseed oil, olive oil, rapeseed oil, safflower oil, soybean oil, sunflower seed oil, and tung oil.

Typically, the copolymer particles having the optional pendant crosslinking groups contains as polymerized units crosslinking monomer in the range of from 0 to 15 mole %, preferably in the range of from 1 to 10 mole %, and more preferably from 1 to 5 mole %, based on total polymerized monomer contained in the copolymer particles.

The copolymer particles are prepared by any process that provides polymerization of the first monomers, the nonionic monomers, and the optional anionic monomers. Suitable processes include suspension or emulsion polymerization, including for example, the processes disclosed in U.S. Pat. No. 5,356,968 and U.S. Pat. No. 5,264,530. An alternate process to prepare the copolymer particles is solution polymerization followed by the conversion of the solution polymer to the copolymer particles by various methods known in the art. Aqueous emulsion polymerization is a preferred process for preparing the copolymer particles. Temperatures suitable for aqueous emulsion polymerization processes are in the range of from 20° C. to less than 100° C., preferably in the range of from 40° C. to 95° C., and more preferably in the range of from 50° C. to 90° C. Suitable polymerization processes, which include emulsion polymerization, solution polymerization, and suspension polymerization processes, are typically conducted as batch, semicontinuous, or continuous processes. The polymerization processes commonly employ various synthesis adjuvants such as thermal or redox polymerization initiators, chain transfer agents, catalysts, surfactants, high molecular weight polymers, dispersants, salts, buffers, acids, or bases. Preferably, the use of organic solvents is minimized in the polymerization process to provide aqueous dispersions with low levels of VOCs. The aqueous dispersion containing the copolymer particles is optionally treated to remove VOCs by processes such as steam stripping or distillation. The aqueous dispersion containing the copolymer particles is typically provided at polymer solids levels in the range of at least 30 weight %, preferably from 35 to 70 weight %, and more preferably, in the range of from 40 to 60 weight %, based on the weight of the aqueous dispersion.

In one embodiment, the copolymer particles are made by a two stage emulsion polymerization process. In the two stage polymerization process, a first polymer is prepared by aqueous emulsion polymerization of a first monomer mixture to form particles of the first polymer. Next, a second polymer is prepared in the presence of the first polymer particles by aqueous emulsion polymerization of a second monomer mixture to the copolymer particles. The first monomer may be included in the first monomer mixture, the second monomer mixture, or in both monomer mixtures. The two stage copolymer particles useful in the aqueous copolymer composition have various morphologies including core/shell, acorn, interpenetrating polymers, multiple small polymer domains within a continuous polymer phase, or multilobe morphologies.

The aqueous copolymer composition of this invention also contains at least one unsaturated fatty acid ester. The unsaturated fatty acid ester is a coalescent and lowers the minimum film formation temperature of the copolymer particles. The unsaturated fatty acid ester is also autoxidizable in the presence of atmospheric oxygen. While not being bound by theory, it is believed that after formation of a dry film from the aqueous copolymer composition, the oxidation of the unsaturated fatty acid ester results in the reduction or the elimination of the coalescent activity of the unsaturated fatty acid ester, leading to increased hardness in the dry film.

The unsaturated fatty acid esters suitable for use in the composition of this invention are characterized by the chemical structure $R_1C(O)OR_2$, wherein $R_1C(O)O$ is an unsaturated fatty acid component and $R_2$ is an organic group that forms the ester component. The group $R_1$ is a $C_8$ to $C_{28}$ hydrocarbon containing at least one unsaturated bond. The degree of unsaturation of the $R_1$ group is either monounsaturated or polyunsaturated, such as diunsaturated and triunsaturated. Suitable unsaturated fatty acid esters include monounsaturated fatty acids formed from palmitoleic acid, oleic acid, or caproleic acid; diunsaturated fatty acid esters formed from linoleic acid; triunsaturated fatty acid esters formed from linolenic acid or eleosteric acid, or mixtures thereof. Preferred are unsaturated fatty acid esters formed from monounsaturated, diunsaturated fatty acids, or mixtures thereof. More preferred are unsaturated fatty acid esters formed from diunsaturated fatty acid. The organic group, $R_2$, which forms the ester component of the unsaturated fatty acid ester, typically contains from 1 to 8 carbon atoms, and includes substituted or unsubstituted alkyl groups containing from 1 to 8 carbons, and alkyl ether groups. Examples of suitable unsubstituted alkyl groups include alkyl groups such as methyl, ethyl, n-propyl, isopropyl, and t-butyl groups. Examples of suitable substituted alkyl groups include alkyl groups containing alcohol moieties such as organic groups formed from ethylene glycol and propylene glycol. Examples of suitable alkyl ether groups include groups formed from polyethers such as diethylene glycol, triethylene glycol, dipropylene glycol, tripropylene glycol, and diethylene glycol monobutyl ether. Preferred unsaturated fatty acid esters include methyl and ethyl esters of diunsaturated fatty acids; and unsaturated fatty acid esters formed from ethylene glycol or propylene glycol.

Suitable sources for preparing the unsaturated fatty acid esters include unsaturated fatty acids or mixtures of unsaturated fatty acids derived from plant sources such as corn oil, cotton seed oil, peanut oil, olive oil, castor oil, dehydrated castor oil, wheat germ oil, poppy seed oil, safflower oil, soybean oil, and sunflower seed oil.

In one embodiment, the unsaturated fatty ester or the mixture of unsaturated fatty acid esters contained in the aqueous copolymer composition is further characterized as having an average iodine number of at least 50, preferably at least 80, and more preferably at least 100. The average iodine number is a measure of the degree of unsaturation of the unsaturated fatty acid ester or the mixture of unsaturated fatty acid esters, and is determined using ASTM method 1959-97.

In a different embodiment, the aqueous copolymer composition of this invention contains less than 10 weight % triunsaturated fatty acid ester, preferably, less than 8 weight %, and more preferably at least less than 5 weight %, based on the total weight of the unsaturated fatty acid esters contained in the aqueous copolymer composition. The use of the less than 10 weight % triunsaturated fatty acid esters, based on the total weight of the unsaturated fatty acid esters in the aqueous copolymer composition is believed to minimize the development of yellow color in the dried films prepared from the aqueous copolymer composition.

In the aqueous copolymer composition, suitable levels of copolymer particles are in the range of from 5 to 70 weight %, preferably from 10 to 65 weight %, and more preferably, in the range of from 15 to 55 weight %, based on the weight of the aqueous copolymer composition. Suitable levels of the one or more unsaturated fatty acid esters in the aqueous copolymer composition are in the range of from 0.1 to 5 weight %, preferably from 0.25 to 4 weight %, and more preferably, in the range of from 0.3 to 3 weight %, based on the weight of the aqueous copolymer composition. The aqueous copolymer composition typically includes from 20 to 79 weight % aqueous medium, based on the weight of the aqueous copolymer composition. The aqueous medium contains water, optionally water miscible solvents such as alcohols or ketones; and optionally dissolved or solubilized materials such as salts or surfactants.

A volatile organic compound ("VOC") is defined herein as a carbon containing compound that has a boiling point below 280° C. at atmospheric pressure. Compounds such as water and ammonia are excluded from VOCs.

The aqueous copolymer composition of this invention contains less than 5% VOC by weight based on the total weight of the aqueous copolymer composition; preferably the aqueous copolymer composition contains less than 3% VOC by weight based on the total weight of the aqueous copolymer composition; more preferably the aqueous copolymer composition contains less than 1.7% VOC by weight based on the total weight of the aqueous copolymer composition. A "low VOC" aqueous copolymer composition herein is an aqueous copolymer composition that contains less than 5% VOC by weight based on the total weight of the aqueous copolymer composition; preferably it contains between 0.01% and 1.7% by weight based on the total weight of the aqueous copolymer composition.

Additionally, the low VOC aqueous copolymer composition optionally contains coalescing agents that are not VOCs. A coalescing agent is a compound that is added to a waterborne emulsion polymer, paint or coating to reduce the minimum film forming temperature of the emulsion polymer, paint or coating by at least 1° C. A non-VOC coalescing agent is thus defined as a coalescing agent which has a boiling point above 280° C. at atmospheric pressure.

Typical methods of paint or coating preparation introduce adventitious VOCs from the aqueous dispersion containing the copolymer particles having pendant crosslinking groups, biocides, defoamers, soaps, dispersants, and thickeners. These typically account for 0.1% VOC by weight based on the total weight of the aqueous copolymer composition. Additional methods such as steam stripping and choice of low VOC containing additives like biocides, defoamers, soaps, dispersants, and thickeners are suitable for further reducing the aqueous copolymer composition to less than 0.01% VOC by weight based on the total weight of the aqueous copolymer composition.

In addition, the aqueous copolymer composition optionally includes other components, including other polymers, surfactants, pigments, extenders, dyes, pearlescents, adhesion promoters, crosslinkers, dispersants, defoamers, leveling agents, optical brighteners, ultraviolet stabilizers, absorbing pigments, coalescents, rheology modifiers, preservatives, biocides, polymer particles having internal voids, and antioxidants, provided that the aqueous copolymer composition contains less than 5% VOC by weight. Auto oxidation can further be enhanced by the use of metal ion catalysts such as cobalt, zirconium, calcium, manganese, copper, zinc and iron. Simple salts such as halides, nitrates, and sulfates maybe used but in many cases an organic anion such as the acetate, naphthenate or acetoacetonate is used.

Suitable pigment levels in the aqueous copolymer composition of this invention include the range of from zero to 70 volume %, preferably from zero to 40 volume %, and more preferably, from 2 to 25 volume %, based on the total volume of pigment and polymer contained in the aqueous copolymer composition.

A method of preparing a coating from the aqueous copolymer composition of this invention includes: applying the aqueous copolymer composition onto a substrate; and drying or allowing to dry the aqueous copolymer composition that was applied onto the substrate to prepare the coating. In the presence of oxygen, the unsaturated fatty acid ester may under reaction which results in the reduction or the elimination of the coalescent activity of the unsaturated fatty acid ester.

The aqueous copolymer composition is suitable for application onto a substrate to prepare a dry coating. Various techniques are employed to apply the aqueous copolymer composition onto a substrate including, for example, brushing, rolling, drawdown, dipping, with a knife or trowel, curtain coating, and spraying methods such as, for example, air-atomized spray, air-assisted spray, airless spray, high volume low pressure spray, and air-assisted airless spray. The wet coating thickness of the applied aqueous copolymer composition may be in the range of 1 micron to 250 microns. The aqueous copolymer composition is applied onto a substrate as a single coat or multiple coats. After application, the applied aqueous copolymer composition is typically allowed to dry at ambient conditions or alternatively dried by the application of heat to provide a dry coating. Drying is typically allowed to proceed under ambient conditions such as, for example, at 0° C. to 35° C.

The aqueous copolymer composition is suitable for application onto various substrates including processed timber such as medium density fiber board, chip board, laminates; mineral substrates such as masonry, cement, fiber cement, cement asbestos, plaster, plasterboard, glazed and unglazed ceramic; metal substrates such as galvanized iron, galvanized steel, cold rolled steel, Zincalum metal, Zincalum II metal, aluminum, wrought iron, drop forged steel, stainless steel; previously painted or primed surfaces (fresh, aged or weathered) including but not limited to acrylic coatings, vinyl acrylic coatings, styrene acrylic coatings, powder coated surfaces, solvent acrylic coatings, alkyd resin coatings, solvent urethane coatings, epoxy coatings; cellulosic substrates such as paper and paperboard; glass; asphalt; leather; wallboard; nonwoven materials; and synthetic substrates such as polyvinyl chloride, polyvinylidene chloride, polyethylene, and polypropylene.

The dry coating prepared from the aqueous copolymer composition is suitable as a protective coating or an aesthetic coating. Examples of suitable coatings include architectural coatings such as interior and exterior paint coatings, including masonry coatings, wood coating and treatments; floor polishes; maintenance coatings such as metal coatings; paper coatings; and traffic coatings such as those coatings used to provide markings on roads, pavements, and runways.

The following examples are presented to illustrate the composition and the process of the invention. These examples are intended to aid those skilled in the art in understanding the present invention. The present invention is, however, in no way limited thereby.

The following examples are presented to illustrate the composition and the process of the invention. These examples are intended to aid those skilled in the art in understanding the present invention. The present invention is, however, in no way limited thereby.

The following abbreviations are used in the examples:

| | |
|---|---|
| AN | acrylonitrile |
| APS | ammonium persulfate |
| EHA | 2-ethylhexyl acrylate |
| MAA | methacrylic acid |
| MMA | methyl methacrylate |
| surfactant-A | ethoxylated sodium laureth sulfate having 1 to 4 ethylene oxide groups per molecule (31 wt. %) |
| STY | styrene |

EXAMPLE 1

Preparation of Aqueous Copolymer Compositions

An aqueous copolymer composition was prepared in a 5-liter, four-necked round bottom flask equipped with a paddle stirrer, a thermometer, a nitrogen inlet, and a reflux condenser.

EXAMPLE 1.1

A monomer emulsion was prepared by combining 400 g deionized water, 46.2 g surfactant-A, 751.3 g EHA, 504.6 g STY, 342.8 g AN, 45.0 g MMA, and 60.6 g MAA. The container used to weigh the monomers was rinsed with 43.3 g deionized water. To the flask was added 1272.0 g deionized water and 2.4 g surfactant-A. The contents of the flask was heated to 89° C. under a nitrogen atmosphere and 114.8 g of the monomer emulsion was added to the flask followed by the addition of a solution containing 4.2 g APS dissolved in 45 g deionized water. The containers that held the monomer emulsion and the APS solutions were rinsed with 38.6 g of deionized water. The rinse water was then added to the flask. After stirring for 15 minutes, the remaining monomer emulsion and a solution of 2.8 g of APS and 6.4 g of aqueous ammonia, (28 wt. % active) in 80 g of deionized water were added linearly and separately to the flask over a period of 1.5 to 4 hours. The contents of the flask was maintained at a temperature of 89° C. during the addition. When all additions were complete, the containers were rinsed with 47.6 g deionized water, which was added to the flask. A catalyst/activator pair was added after the monomer emulsion feed was completed. The resulting aqueous copolymer composition was neutralized with aqueous ammonia (29%).

The aqueous copolymer composition of Example 1.1 had a solids content of 44.0 weight % and a pH of 8.5. The polymer particles of Example 1.1 had an average particle diameter of 121 nm, a glass transition temperature of −11° C., and contained as polymerized units: 30.7 STY/43.4 EHA/2.6 MMA/19.8 AN/3.5 MAA, on a weight basis.

Comparative A

The comparative copolymer composition of Comparative A was prepared according to the general procedure for Example 1.1 except that the monomer emulsion was prepared by admixing 400 g of deionized water, 46.2 g surfactant-A, 760.0 g EHA, 531.5 g STY, 379.1 g MMA, and 60.6 g MAA.

The aqueous copolymer composition of Comparative A had a solids content of 44.2 weight % and a pH of 9.0. The polymer particles of Comparative A had an average particle diameter of 109 nm, a glass transition temperature of −10° C., and contained as polymerized units: 30.7 STY/43.4 EHA/21.9 MMA/3.5 MAA, on a weight basis.

EXAMPLE 2

Preparation of Paints Containing the Aqueous Copolymer Composition and Comparative Aqueous Copolymer Composition Black gloss paints were prepared by admixing the ingredients in the order listed in Table 2.1. The black gloss paints had pigment volume concentrations of 4.3%, % volume solids of 35.5%, and % weight solids of 35.9 wt. %. The unsaturated fatty acid ester was propylene glycol esters sunflower oil, reported as predominately propylene glycol monoesters of sunflower oil fatty acids (Archer Daniel Midland). Sunflower oil contains 25.1 wt. % oleic fatty acid, 66.2 wt. % linoleic acid, and 8.7 saturated oils (*Handbook of Chemistry and Physics*, 76th Edition, David R. Lide, Editor, page 7-29 (1995). The coalescent was 2,2,4-trimethyl-1,3-pentanediol monobutyrate. UCD™ 1530E Black Jet Carbon 4 pigment and Acrysol™ RM-8W thickener are products of Rohm and Haas Company.

TABLE 2.1

Compositions of Black Gloss Paints Containing Aqueous Copolymer Composition of Example 1.1 (amounts in grams)

| Ingredient | Example 2.1 | Example 2.2 | Comparative B |
|---|---|---|---|
| Example 1.1 | 672.66 | 672.66 | 672.66 |
| Water | 55.00 | 56.08 | 58.23 |

TABLE 2.1-continued

Compositions of Black Gloss Paints Containing Aqueous Copolymer Composition of Example 1.1 (amounts in grams)

| Ingredient | Example 2.1 | Example 2.2 | Comparative B |
|---|---|---|---|
| UCD 1530E Black Jet Carbon 4 pigment | 58.39 | 58.39 | 58.39 |
| Unsaturated fatty acid ester | 44.60 | 29.73 | 0 |
| Coalescent | 0 | 14.87 | 44.60 |
| Propylene Glycol | 20.00 | 20.00 | 20.00 |
| Sodium Nitrite (15 wt. %) | 9.00 | 9.00 | 9.00 |
| Acrysol ™ RM-8W thickener | 9.12 | 9.12 | 9.12 |
| Wt. % VOC | 2.3 | 4.0 | 7.4 |

TABLE 2.1

Compositions of Black Gloss Paints Containing Comparative Aqueous Copolymer Composition of Comparative A (amounts in grams)

| Ingredient | Comparative C | Comparative D | Comparative E |
|---|---|---|---|
| Comparative A | 669.62 | 669.62 | 669.62 |
| Water | 55.00 | 56.08 | 58.23 |
| UCD 1530E Black Jet Carbon 4 pigment | 58.39 | 58.39 | 58.39 |
| Unsaturated fatty acid ester | 44.60 | 29.73 | 0 |
| Coalescent | 0 | 14.87 | 44.60 |
| Propylene Glycol | 20.00 | 20.00 | 20.00 |
| Sodium Nitrite (15 wt. %) | 9.00 | 9.00 | 9.00 |
| Acrysol ™ RM-8W thickener | 9.12 | 9.12 | 9.12 |
| Wt. % VOC | 2.3 | 4.0 | 7.4 |

Dried coated samples are prepared for each black gloss paint by applying a 76 micron thick wet film of the paint onto a Leneta chart (form W9, The Leneta Co., NJ). The applied coatings are allowed to dry at 24° C. and 50% relative humidity for 7 hours.

EXAMPLE 3

Block Resistance of the Coated Substrates

The block resistance of the coated substrates were evaluated according to ASTM D4946-89. Weights were applied to the samples for durations of 30 minutes or 24 hours. The coated samples were rated for block resistance on a scale of 0 to 10 as follows:

10=no tack, perfect

9=trace tack, excellent

8=slight tack, very good

7=slight tack, good

6=moderate tack, good

5=moderate tack, fair

4=severe tack, no seal, fair

3=5-25% seal, poor

2=25-50% seal, poor

1=50-75% seal, poor

0=complete seal, very poor

A block rating of 5 and above indicated acceptable 30 minute block properties. A block rating of 4 and above indicated acceptable 24 hour block properties.

TABLE 3.1

Block Resistance of Black Gloss Coated Samples

| Coated Sample | 30 minute Block Resistance | 24 hour Block Resistance | Wt. % VOC |
|---|---|---|---|
| Example 2.1 | 5 | 4 | 2.3 |
| Example 2.2 | 6 | 5 | 4.0 |
| Comparative B | 7 | 7 | 7.4 |
| Comparative C | 0 | 0 | 2.3 |
| Comparative D | 0 | 0 | 4.0 |
| Comparative E | 6 | 0 | 7.4 |

The results in Table 3.1 show that the coatings prepared from the low VOC aqueous copolymer compositions of Examples 2.1-2.2, which contained copolymer particles containing polymerized acrylonitrile, have improved and acceptable block resistance compared to the comparative coatings prepared from the low VOC compositions of Comparatives C and D, which contained comparative copolymer particles absent polymerized acrylonitrile. The comparative compositions of Comparative B and E, which contained volatile coalescent but did not contain the reactive nonvolatile coalescent, provided coatings with acceptable block resistance. However, these comparative compositions were not low VOC compositions.

What is claimed is:

1. An aqueous copolymer composition comprising:
    a) copolymer particles comprising as polymerized units, based on weight of said copolymer particles:
        i) from 5 to 60 weight % of a first monomer selected from (meth)acrylonitrile, (meth)acrylamide, or combinations thereof,
        ii) from 25 to 95 weight % of a nonionic monomer free of nitrogen; and
        iii) from 0 to 15 weight % of an anionic monomer, wherein none of units in the copolymer particles is derived from an N-vinyl compound; and
    b) one or more unsaturated fatty acid esters;
    wherein said copolymer particles have a glass transition temperature in the range of from zero to 70° C.

2. The aqueous copolymer composition according to claim 1 wherein said aqueous copolymer composition comprises less than 5 weight % volatile organic compounds, based on weight of said aqueous copolymer composition.

3. The aqueous copolymer composition according to claim 1 comprising from 2 to 30 weight % of said unsaturated fatty acid esters, based on weight of said copolymer particles.

4. The aqueous copolymer composition according to claim 1 wherein said unsaturated fatty acid ester is selected from the group consisting-of esters of palmitoleic acid, oleic acid, caproleic acid, linoleic acid, and mixtures thereof.

5. The aqueous copolymer composition according to claim 1 wherein said unsaturated fatty acid ester has an average iodine number of at least 50.

6. A method for preparing a coating, comprising the steps of:
    a) applying an aqueous copolymer composition onto a substrate; wherein said aqueous copolymer composition comprises copolymer particles comprising as polymerized units, based on weight of said copolymer particles:
        i) from 5 to 60 weight % of a first monomer selected from (meth)acrylonitrile, (meth)acrylamide, and combinations thereof, ii) from 25 to 95 weight % of a nonionic monomer, and iii) from 0 to 15 weight % of an anionic monomer, wherein none of units in the copolymer particles is derived from an N-vinyl compound; and b) drying or allowing to dry said aqueous copolymer composition applied to-said substrate to prepare the coating.

7. The method according to claim 6 wherein said aqueous copolymer composition comprises less than 5 weight % volatile organic compounds, based on weight of said aqueous copolymer composition.

8. The method according to claim 6 wherein said aqueous copolymer composition comprises from 2 to 30 weight % of said unsaturated fatty acid esters, based on weight of said copolymer particles.

9. The method according to claim 6 wherein said unsaturated fatty acid ester is selected from the group consisting of esters of palmitoleic acid, oleic acid, caproleic acid, linoleic acid, and mixtures thereof.

10. The method according to claim 6 wherein said unsaturated fatty acid ester has an average iodine number of at least 50.

11. The aqueous copolymer composition of claim 1 wherein said one or more unsaturated fatty acid esters comprise from 0.1 to 5 weight %, based on weight of said aqueous copolymer composition.

12. The aqueous copolymer composition of claim 1 wherein said one or more unsaturated fatty acid esters comprise from 0.3 to 3 weight %, based on weight of said aqueous copolymer composition.

13. The aqueous copolymer composition of claim 1 wherein said nonionic monomer comprises a monomer selected from the group consisting of styrene, butadiene, a-methyl styrene, vinyl toluene, vinyl naphthalene, ethylene, propylene, vinyl acetate, vinyl versatate, vinyl chloride, vinylidene chloride, $C_1$-$C_{40}$ alkyl esters of (meth)acrylic acid, isobornyl (meth)acrylate, benzyl (meth)acrylate, phenyl (meth)acrylate, 2-bromoethyl (meth)acrylate, alkoxyalkyl (meth)acrylate, full esters of ethylenically unsaturated di- and tricarboxylic acids and anhydrides, tripropylene glycol di(meth)acrylate, diethylene glycol di(meth)acrylate, ethylene glycol di(meth)acrylate, 1,6-hexanediol di(meth)acrylate, 1,3-butylene glycol di(meth)acrylate, polyalkylene glycol di(meth)acrylate, diallyl phthalate, trimethylolpropane m(meth)acrylate, divinylbenzene, divinyltoluene, trivinylbenzene, divinyl naphthalene, and combinations thereof.

14. The aqueous copolymer composition of claim 1 wherein said copolymer particles comprise a glass transition temperature in the range of from 20 to 40° C.

15. The aqueous copolymer composition of claim 1 wherein said first monomer comprises 10 to 40 weight %, based on weight of said copolymer particles.

* * * * *